(12) United States Patent
Khenkin et al.

(10) Patent No.: US 11,190,890 B2
(45) Date of Patent: Nov. 30, 2021

(54) TESTING OF MULTIPLE ELECTROACOUSTIC DEVICES

(71) Applicant: Cirrus Logic International Semiconductor Ltd., Edinburgh (GB)

(72) Inventors: Aleksey Khenkin, Austin, TX (US); Kevin Stoddart, Edinburgh (GB); Gordon Cowan, Edinburgh (GB); Keith Getz, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 70 days.

(21) Appl. No.: 16/500,157

(22) PCT Filed: Apr. 12, 2017

(86) PCT No.: PCT/US2017/027117
§ 371 (c)(1),
(2) Date: Oct. 2, 2019

(87) PCT Pub. No.: WO2018/190818
PCT Pub. Date: Oct. 18, 2018

(65) Prior Publication Data
US 2021/0120352 A1    Apr. 22, 2021

(51) Int. Cl.
*H04R 29/00* (2006.01)
*G01H 3/00* (2006.01)
*H04R 19/04* (2006.01)
*H04R 31/00* (2006.01)

(52) U.S. Cl.
CPC .......... *H04R 29/004* (2013.01); *G01H 3/005* (2013.01); *H04R 19/04* (2013.01); *H04R 31/006* (2013.01); *H04R 2201/003* (2013.01); *H04R 2499/11* (2013.01)

(58) Field of Classification Search
CPC .... H04R 29/004; H04R 31/006; H04R 19/04; H04R 2499/11; H04R 2201/003; H04R 29/007; G01H 3/005
See application file for complete search history.

(56) References Cited

U.S. PATENT DOCUMENTS

| 9,400,262 | B2* | 7/2016 | Doller | B81C 99/0045 |
| 9,560,462 | B2* | 1/2017 | Eriksen | H04R 29/004 |
| 2009/0304192 | A1* | 12/2009 | Zhuang | H04R 29/004 |
| | | | | 381/58 |

(Continued)

FOREIGN PATENT DOCUMENTS

| CN | 102547547 A | 7/2012 |
| CN | 205320292 U | 6/2016 |

(Continued)

*Primary Examiner* — Oyesola C Ojo
(74) *Attorney, Agent, or Firm* — Norton Rose Fulbright US LLP

(57) ABSTRACT

An acoustic testing apparatus may include connections for multiple devices under test (DUTs) to support simultaneous testing of two or more miniature electroacoustic devices. The acoustic testing apparatus may allow the testing of multiple DUTs with a ratio of less than one reference microphone per DUT. Thus, the speed of testing DUTs may be increased without adding significant cost through additional reference microphones. For example, a single reference microphone may be used to test two or four DUTs coupled together through an acoustic test cavity.

16 Claims, 6 Drawing Sheets

(56) References Cited

U.S. PATENT DOCUMENTS

| | | | | |
|---|---|---|---|---|
| 2010/0290634 A1* | 11/2010 | Schaule | ............... | H04R 29/004 381/58 |
| 2015/0043747 A1* | 2/2015 | Barham | ................... | H04R 1/28 381/98 |
| 2015/0117654 A1* | 4/2015 | John | .................... | H04R 29/004 381/59 |
| 2015/0195665 A1* | 7/2015 | Salvia | ................... | H04R 29/004 381/59 |
| 2016/0198276 A1* | 7/2016 | Stetson | ................ | H04R 29/004 381/58 |

FOREIGN PATENT DOCUMENTS

| | | | | |
|---|---|---|---|---|
| CN | 205491155 U | 8/2016 | | |
| WO | 2013001316 A1 | 1/2013 | | |
| WO | WO-2013001316 | * | 1/2013 | ........... H04R 29/004 |

* cited by examiner

TESTING OF MULTIPLE ELECTROACOUSTIC DEVICES

FIELD OF THE DISCLOSURE

The instant disclosure relates to miniature microphones. More specifically, portions of this disclosure relate to testing and manufacturing of miniature microphones.

BACKGROUND

Miniature microphones, such as microelectromechanical systems (MEMS) microphones, may be tested before sale or before integration in an electronic device. To confirm that a particular miniature microphone is operating within desired specifications, the miniature microphone is used to measure generated sounds in a controlled environment. The same generated sounds are measured with a high-accuracy reference microphone, and the two results are compared to determine the operational capability of the particular miniature microphone. Such a testing process can be used to determine, for example, when a particular miniature microphone has been damaged during manufacturing or when the manufacturing process has failed. One example apparatus for testing miniature microphones is shown in FIG. 1A and FIG. 1B.

FIG. 1A and FIG. 1B are a top-down view and a cross-sectional view, respectively, illustrating an acoustic testing apparatus for microphones according to the prior art. A testing apparatus 100 includes an acoustic volume 110 that acoustically couples a source 120 with a reference microphone 118 and a device under test (DUT) 112. The DUT 112 may connect with the testing apparatus 100 through a mechanical and/or acoustical connection to a DUT socket 114 and an electrical connection through an interface printed circuit board (PCB) 116. The source 120 may be activated to generate a sound field in the acoustic volume 110, which may be measured by the reference microphone 118 and the DUT 112. To test multiple devices, the DUT 112 may be removed from the DUT socket 114 and replaced with another DUT.

The testing apparatus 100 is limited in throughput for testing DUTs because only one DUT 112 can be coupled to the acoustic volume 110 at a time. Thus, increasing throughput of DUTs through testing requires multiple testing apparatuses. The testing apparatuses consume space in manufacturing facilities, partially because of the large size of the reference microphone 118. Furthermore, the reference microphone 118 is an expensive tool such that increasing a number of testing apparatuses to improve testing throughput is an expensive solution.

Shortcomings mentioned here are only representative and are included simply to highlight that a need exists for testing devices, including miniature microphones employed in consumer-level devices such as mobile phones. Embodiments described herein address certain shortcomings but not necessarily each and every one described here or known in the art. Furthermore, embodiments described herein may present other benefits than, and be used in other applications than, those of the shortcomings described above.

SUMMARY

An acoustic testing apparatus may include connections for multiple devices under test (DUTs) to support simultaneous testing of two or more miniature electroacoustic devices. "Miniature electroacoustic devices" or "miniature microphones" refer to microphones including MEMS and small electric microphones smaller than about six millimeters in one dimension. The acoustic testing apparatus may allow the testing of multiple DUTs with a ratio of less than one reference microphone per DUT. Thus, the speed of testing DUTs may be increased without adding significant cost or size through additional reference microphones. For example, a single reference microphone may be used to test two or four DUTs coupled together through an acoustic test cavity. One or more sound sources may be coupled to the acoustic test cavity to generate a test sound field. Two or more sound sources may be used to obtain a desired sound pressure level (SPL) within the acoustic test cavity as the number of DUTs increases and thus the size of the acoustic test cavity increases.

Electronic equipment may be electrically coupled to the DUTs, the sound sources, and the reference microphones, to perform simultaneous testing of the DUTs attached to the testing apparatus. For example, a personal computer (PC) or other programmable logic controller (PLC) may activate the sound sources with a particular desired output, and simultaneously record the output from the DUTs and the reference microphone. The controller may be electrically coupled to the components through an interface printed circuit board (PCB) that forms part of the enclosure around the acoustic test cavity. In some embodiments, the desired output for the sound sources may be a series of sounds of different frequencies and different intensities. The PC may compare the recorded output from the DUTs with the recorded output from the reference microphone to determine an error value indicating a difference in the recorded output of the DUTs from the recorded output of the reference microphone. When the error value is within a predetermined threshold amount around the reference microphone output, the DUT may be determined to be within specification.

The DUTs, such as miniature microphones, may be incorporated into electronic devices. Reducing the number of inoperable or unacceptable microphones installed in electronic devices reduces manufacturing cost, reduces warranty service, and improves customer loyalty. Electronic devices that may incorporate the miniature microphones may be used in electronic devices with audio outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like.

According to one embodiment, an apparatus may include an acoustic test cavity comprising an enclosed air volume; a reference microphone coupled to the acoustic test cavity; at least two sound sources coupled to the acoustic test cavity; and at least two device sockets configured to each receive a device to couple to the acoustic test cavity for simultaneous testing using the reference microphone and the at least two sound sources.

Several configurations for the location of the DUTs with respect to each other and with reference to the acoustic test cavity are described herein, however many other configurations of testing apparatuses for testing multiple DUTs with a single reference microphone are possible and within the scope of this disclosure. For example, in some configurations, the reference microphone is coupled at an approximate center of the acoustic test cavity and the testing apparatus is configured such that the sound sources and DUTs are positioned approximately equidistantly from the reference microphone. An approximate center may refer to a location that is within 95-99.9% of a middle point of a line from one side of the acoustic test cavity to another side of the acoustic test cavity. An approximately equidistant amount may refer to a variation of distances between a DUT and the reference microphone that is within 95-99.9% of other distances between another DUT and the reference microphone. In some embodiments, the sounds sources and DUTs may be positioned symmetrically around the center reference microphone.

The acoustic test cavity that acoustically couples the DUTs to the sources and reference microphone may have any variety of shapes. In different examples, the acoustic test cavity is elliptical, circular, rectangular, square, or polygonal. The acoustic test cavity may be formed as an enclosed space between a platform and an attached interface printed circuit board (PCB) that defines an enclosed volume. When the interface PCB is a flat board, the shape of the platform may define the shape of the acoustic test cavity. In some embodiments, the acoustic test cavity may have petal-shaped paths extending from a central circular opening, and the DUTs and sources may be acoustically coupled to the reference microphone and sources through an opening in the PCB to one of the petals, and each of the DUTs or sources may be located within a different petal. In some embodiments, the petals may be curved such that there is no direct acoustical path from one of the DUTs to another of the DUTs.

According to another embodiment, a method may include simultaneously testing two or more miniature microphone devices with a single reference microphone in an acoustic test cavity comprising an enclosed air volume. The method may include inserting two or more miniature electroacoustic devices (e.g., microphones) into two or more test sockets of an apparatus, wherein the two or more test sockets are coupled to an acoustic test cavity comprising an enclosed air volume, and wherein the acoustic test cavity is coupled to a single reference microphone for simultaneously testing the two or more miniature electroacoustic devices; activating two or more sound sources coupled to the acoustic test cavity to generate a sound field within the acoustic test cavity; measuring a reference output from the single reference microphone in response to the sound field; measuring outputs from the two or more miniature electroacoustic devices in response to the sound field; and/or comparing the reference output with each of the outputs from the two or more miniature electroacoustic devices. The two or more miniature microphone devices may be two or more microelectromechanical systems (MEMS) microphone devices or a mix of miniature microphone devices such as MEMS microphones. The testing of the miniature electroacoustic devices may be part of a manufacturing process for an electronic device to confirm operation of the electroacoustic devices within desired specifications. The testing may be performed with one of the described embodiments of a testing apparatus described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims.

Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1A:
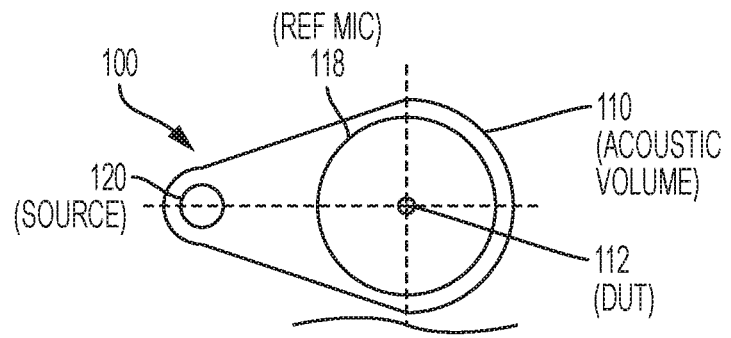
FIG. 1A is a top-down view illustrating an acoustic testing apparatus for microphones according to the prior art.
Figure 1B:
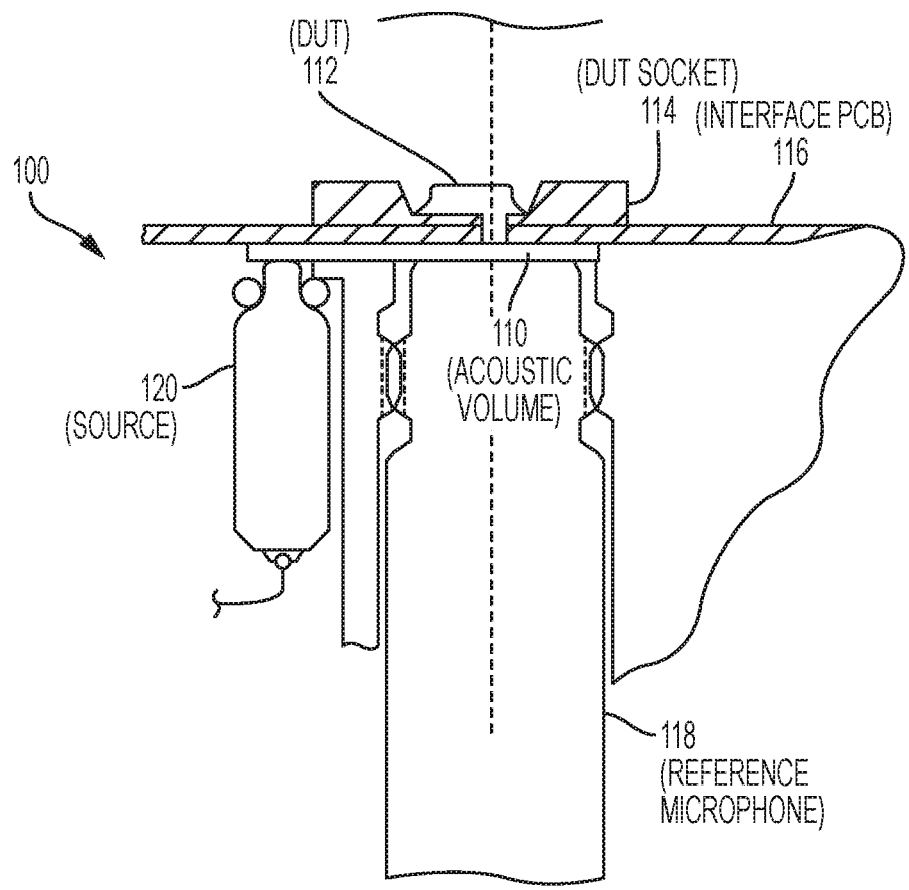
FIG. 1B is a cross-sectional view illustrating an acoustic testing apparatus for microphones according to the prior art.
Figure 2:
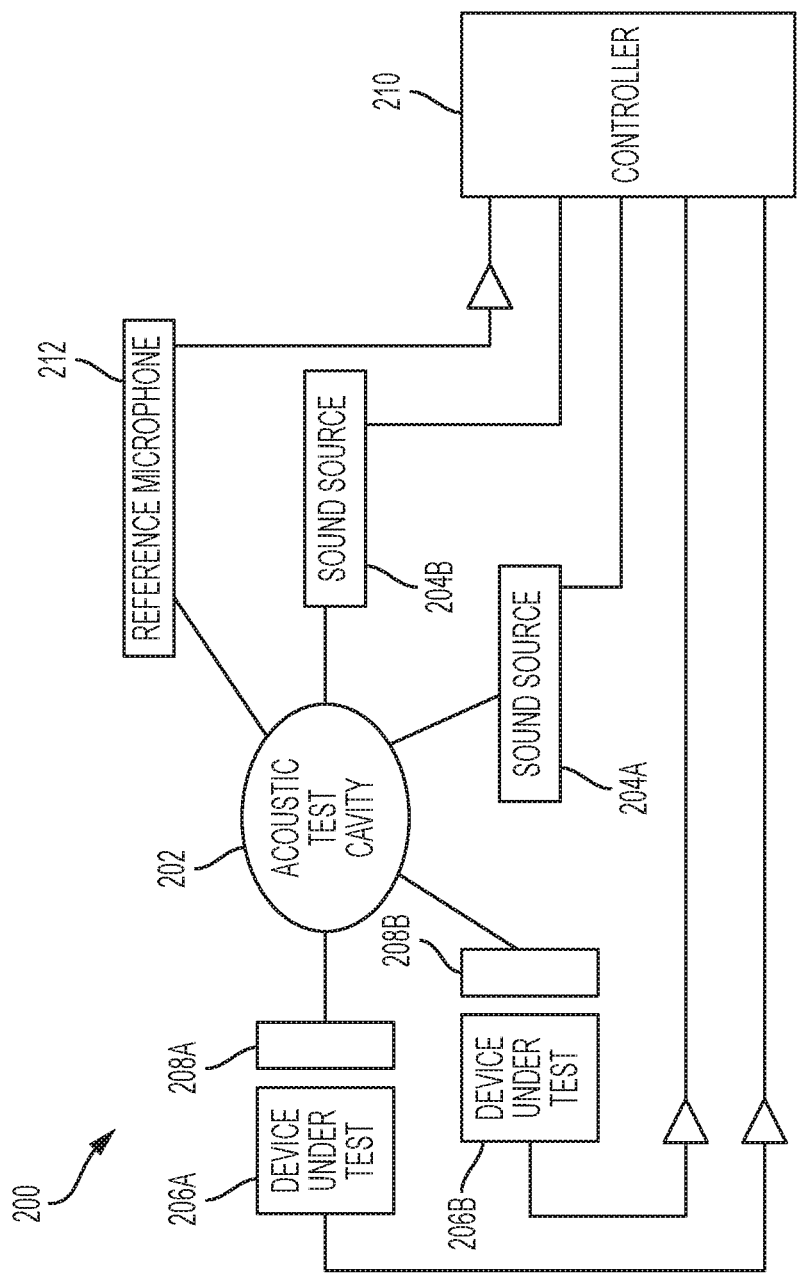
FIG. 2 is a block diagram illustrating an acoustic testing apparatus for simultaneously testing multiple miniature microphones according to some embodiments of the disclosure.

FIG. 2 is a block diagram illustrating an acoustic testing apparatus for simultaneously testing multiple miniature microphones according to some embodiments of the disclosure. A testing apparatus 200 may include an acoustic test cavity 202 acoustically coupled to several other components. The acoustic test cavity 202 may be a pressure cavity environment. The cavity 202 may be designed with a uniformity of pressure field inside the cavity 202 across the frequency range of interest. For example, at the highest frequency, the pressure variation may not exceed a specified amount. In some embodiments, the longest dimension of the cavity 202 is less than ⅙ of the shortest wavelength. In other embodiments, the cavity 202 may be larger with correction functions applied to the recorded testing data as described below.

A reference microphone 212, sound sources 204A-B, and devices under test (DUTs) 206A-B may be acoustically coupled to the acoustic test cavity 202. The cavity 202 may be sufficiently isolated such that the DUTs 206A-B and reference microphone 212 only receive sounds fields generated by the sources 204A-B. The DUTs 206A-B may be coupled to the cavity 202 through DUT sockets 208A-B, respectively, that allow easy connection of DUTs 206A-B to the testing apparatus 200. A controller 210 may be electrically coupled to the reference microphone 212, sound sources 204A-B, and DUTs 206A-B. The controller 210 may operate the sound sources 204A-B to produce a desired sound field at desired times and record the output from the reference microphone 212 and the DUTs 206A-B in response to the sound field. The controller 210 may perform operations on the recorded outputs or transfer the data to another component, such as a personal computer, for analysis.

Figure 3:
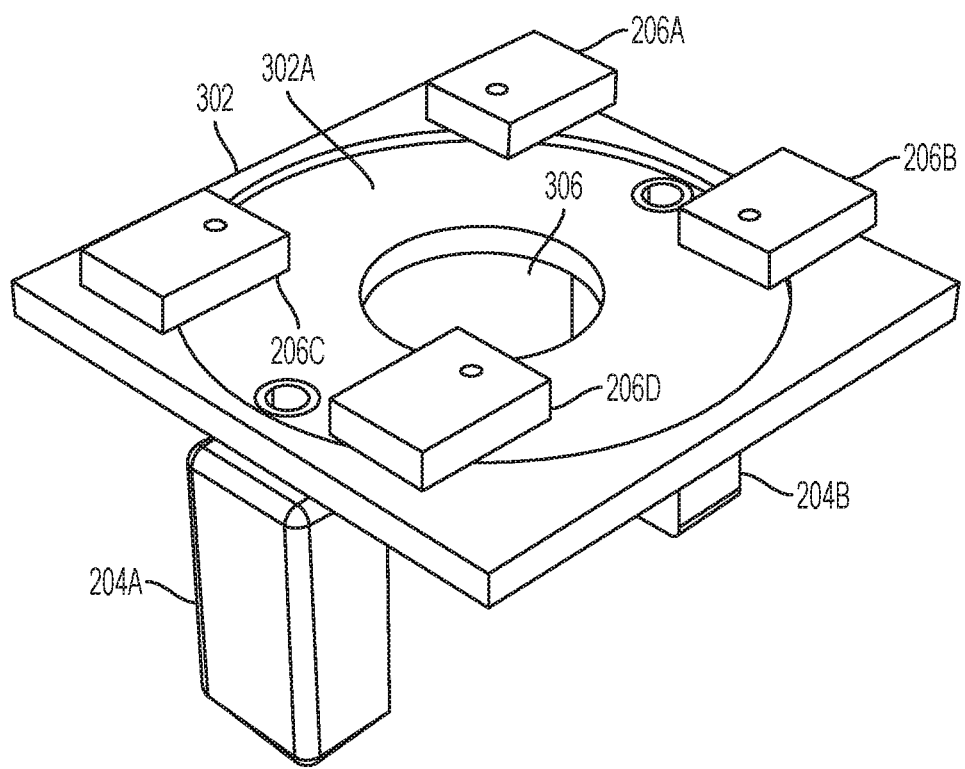
FIG. 3 is an isometric view illustrating an acoustic testing apparatus for simultaneously testing multiple miniature microphones according to some embodiments of the disclosure.

One example testing apparatus for acoustically coupling devices through an acoustic test cavity is shown in FIG. 3. FIG. 3 is an isometric view illustrating an acoustic testing apparatus for simultaneously testing multiple miniature microphones according to some embodiments of the disclosure. A testing apparatus 300 includes a platform 302 with a cut-out 302A for an acoustic test cavity. The cut-out 302A is shown as a circular shape, however other shapes can be used to form the acoustic test cavity. An acoustic test cavity may be formed when a printed circuit board (PCB) (not shown) is placed over the platform to form an enclosed volume from the cut-out 302A. The PCB may include sockets for receiving DUTs 206A-D and openings to acoustically couple the DUTs 206A-D with the acoustic test cavity. The platform 302 may also include openings for acoustically coupling sources 204A-B to the acoustic test cavity, and optionally include mechanical devices for affixing the sources 204A-B to the platform 302. An opening 306 in the platform 302 allows for acoustically coupling a reference microphone (not shown) to the platform 302, and optionally include mechanical devices for affixing the reference microphone to the platform 302. In the example shown in FIG. 3, the sources 204A-B are located symmetrically around the opening 306 for the reference microphone and the DUTs 206A-D are arranged symmetrically around the opening 306. However, other arrangements for components are possible for the testing apparatus 300 to support the testing of DUTs with one or more reference microphones such that a ratio of DUTs to reference microphones is greater than one. Although a single reference microphone is shown, more than one reference microphone may be used. Configurations with a ratio of DUTs to reference microphones that is greater than one provides for improved efficiency when testing miniature microphones and decreases the cost of the testing.

Figure 4A:
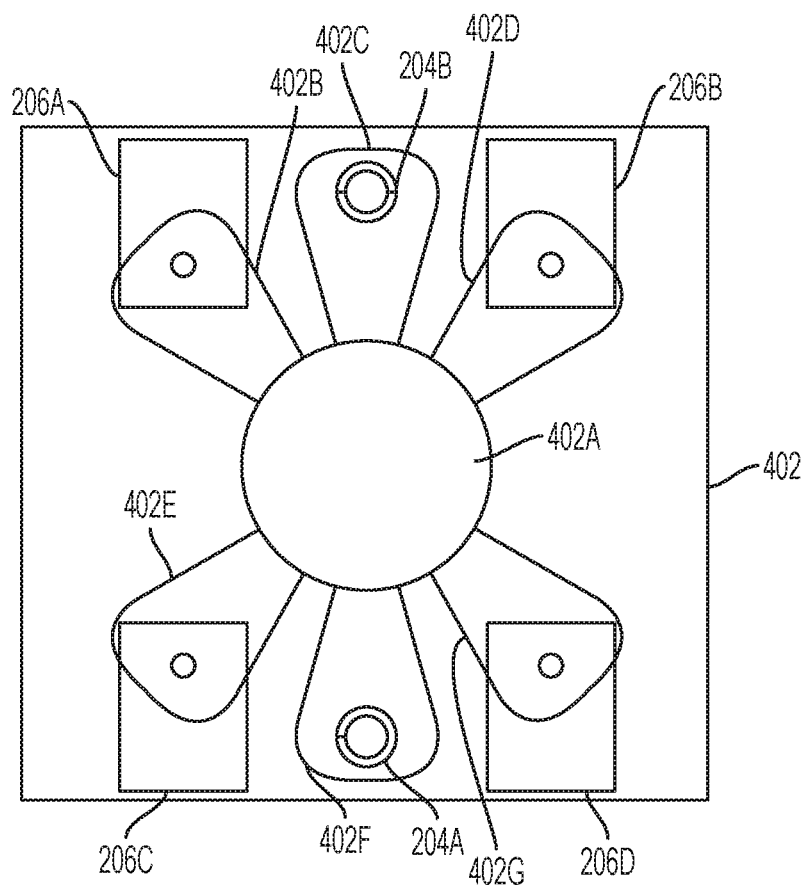
FIG. 4A is a top-down view illustrating an acoustic testing apparatus for simultaneously testing multiple miniature microphones in an acoustic test cavity with devices under test coupled to the acoustic test cavity through petals according to some embodiments of the disclosure.
Figure 4B:
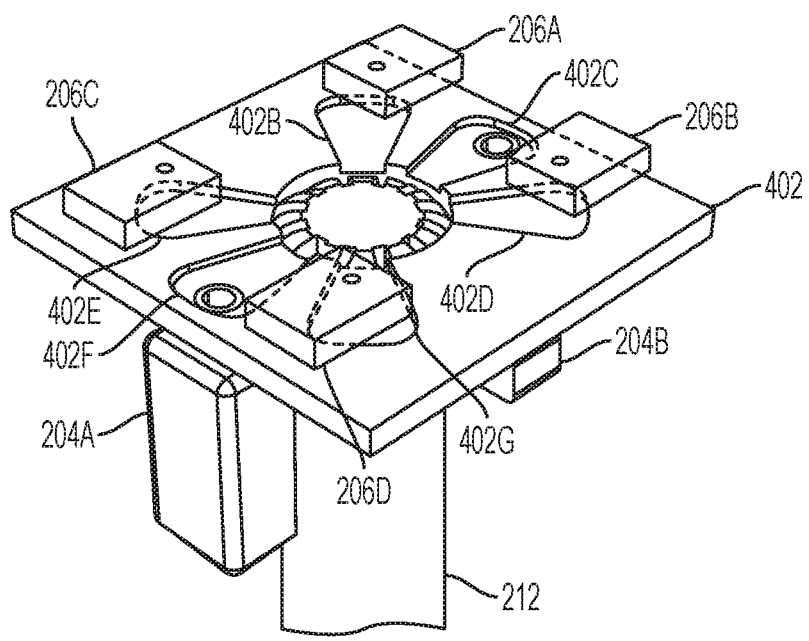
FIG. 4B is an isometric view illustrating an acoustic testing apparatus for simultaneously testing multiple miniature microphones in an acoustic test cavity with devices under test coupled to the acoustic test cavity through petals according to some embodiments of the disclosure.

Another example testing apparatus may include an acoustic test cavity with multiple sections. For example, the test cavity may include a primary shape and secondary shapes attached to the primary shape. The DUTs and sources may be acoustically coupled to the secondary shapes; and the reference microphone may be acoustically coupled to the primary shape. One embodiment of such a testing apparatus is illustrated in FIG. 4A and FIG. 4B. FIGS. 4A-B are a top-down view and an isometric view, respectively, illustrating an acoustic testing apparatus for simultaneously testing multiple miniature microphones in an acoustic test cavity with devices under test coupled to the acoustic test cavity through petals according to some embodiments of the disclosure. A testing apparatus 400 includes a platform 402 with a first cut-out 402A and a plurality of second cut-outs 402B-G. The cut-outs 402A-G may be enclosed by placing an item, such as a PCB, on top of the platform 402 to seal the cut-outs 402A-G from an external environment and form an acoustic test cavity. The first cut-out 402A may have a circular shape and the second cut-outs 402B-G may have petal shapes. However, different shapes than those shown may be used for forming the acoustic test cavity. Each of the sources 204A-B and the DUTs 206A-D may be acoustically coupled to the acoustic test cavity through different petals. The sources 204A-B may couple to the acoustic test cavity through a bottom of the platform 402. The DUTs 206A-D may couple to the acoustic test cavity through the PCB or other item sealing the cut-outs 402A-G.

Figure 5:
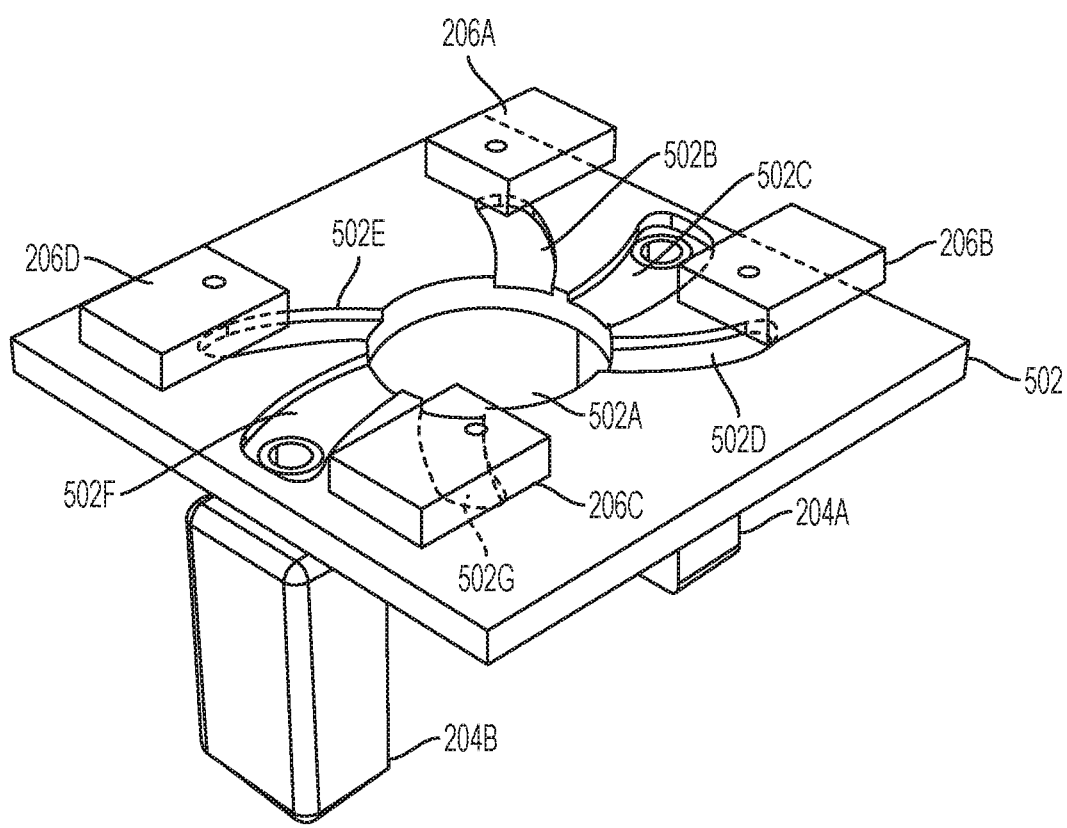
FIG. 5 is an isometric view illustrating an acoustic testing apparatus for simultaneously testing multiple miniature microphones in an acoustic test cavity with devices under test coupled to the acoustic test cavity through curved petals according to some embodiments of the disclosure.

Another example acoustic test cavity with multiple sections is illustrated in FIG. 5. FIG. 5 is an isometric view illustrating an acoustic testing apparatus for simultaneously testing multiple miniature microphones in an acoustic test cavity with devices under test coupled to the acoustic test cavity through curved petals according to some embodiments of the disclosure. A testing apparatus 500 includes a platform 502 with a first cut-out 502A and a plurality of second cut-outs 502B-G. The second cut-outs 502B-G may be curved petal shapes. The curve of the petals may block a direct acoustic path from any one of the DUTs 206A-D and the sources 204A-B with any of the other DUTs 206A-D and sources 204A-B.

Figure 6:
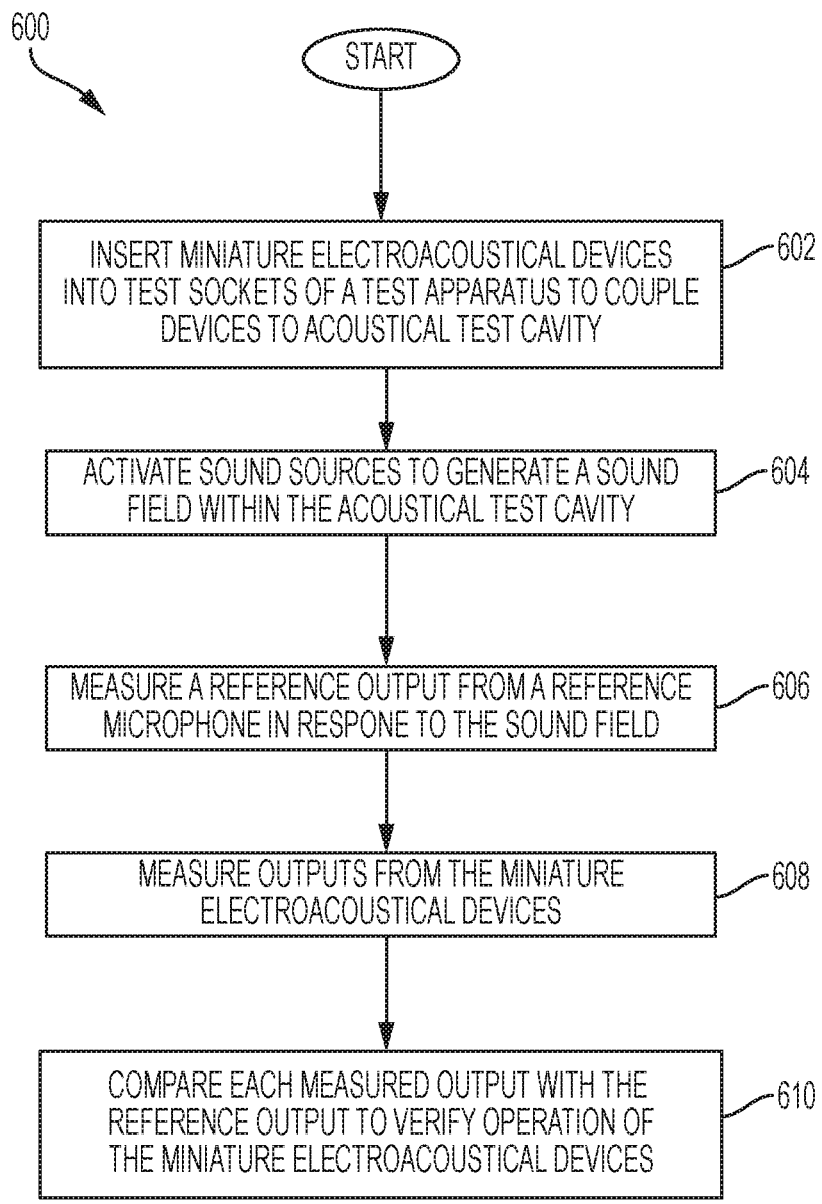
FIG. 6 is a flow chart illustrating an example method for simultaneously testing multiple miniature microphones according to some embodiments of the disclosure.

A method for simultaneously testing two or more electroacoustic devices using a testing apparatus is illustrated in FIG. 6. FIG. 6 is a flow chart illustrating an example method for simultaneously testing multiple miniature microphones according to some embodiments of the disclosure. A method 600 may begin at block 602 with inserting two or more miniature electroacoustic devices (e.g., microphones) into two or more test sockets of a testing apparatus. The two or more test sockets are coupled to an acoustic test cavity having an enclosed air volume acoustically coupled to a single reference microphone for simultaneously testing the two or more miniature electroacoustic devices. The method 600 may be used with any of the testing apparatus embodiments described herein or other testing apparatus that support the simultaneous testing of electroacoustic devices and/or testing of many electroacoustic devices with a single reference microphone.

After inserting the devices under test (DUTs), testing of the DUTs may begin. At block 604, sound sources are activated to generate a sound field within the acoustic test cavity. At block 606, a reference output is measured from the single reference microphone in response to the sound field. At block 608, outputs are measured from the two or more miniature electroacoustic devices in response to the generated sound field. Blocks 604, 606, and 608 may be performed simultaneously or in another order.

At block 610, the measurements from blocks 606 and 608 may be compared to determine operational parameters of the miniature electroacoustic devices. For example, a comparison may be performed to verify that the output of the miniature electroacoustic devices is within a predetermined range around the reference output from the reference microphone. When the comparison indicates that the miniature electroacoustic device is within specifications, the device may be installed in an electronic device. The comparison at block 610 may be performed after recording the outputs and the reference output or may be performed in near-real time with the recording of the measurements.

Processing of the outputs at block 610 may include compensating measurements based on characteristics of the acoustic test cavity and the location of the sources relative to the DUTs and the reference microphone. When DUTs being simultaneously tested are not space equidistant from the reference microphone, the reference output may need to be compensated for the different distances when the reference output is compared to the output of the DUTs. In some embodiments, the DUTs are spaced symmetrically and/or equidistantly from the reference microphone to reduce or eliminate such compensation of the outputs. An "equidistant" spacing may allow for a specific test error, e.g., ±0.1 dB. For this example, phase difference should not exceed ±9° at the highest frequency of the test; e.g., at 20 kHz there is no more than ±0.43 mm difference in the distance between DUTs from the reference microphone. Compensation may also be performed at block 610 when the sources are not located symmetrically and/or equidistantly with respect to the reference microphone.

The schematic flow chart diagram of FIG. 6 is generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above, such as illustrated in FIG. 6, may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. The firmware and/or software may include instructions that cause the processing of signals described herein to be performed.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   an acoustic test cavity comprising an enclosed air volume;
   a reference microphone acoustically coupled to the acoustic test cavity;
   at least two sound sources acoustically coupled to the acoustic test cavity; and
   at least two device sockets configured to each receive a miniature electroacoustic device to acoustically couple at least two miniature electroacoustic devices to the acoustic test cavity for simultaneous testing of the at least two miniature electroacoustic devices using the reference microphone and the at least two sound sources,
   wherein the acoustic test cavity comprises a platform sealed against a printed circuit board (PCB) to form the acoustic test cavity, and wherein the at least two device sockets are positioned over openings through the printed circuit board (PCB) to acoustically couple the at least two miniature electroacoustic devices to the acoustic test cavity.

2. The apparatus of claim 1, wherein the reference microphone is coupled to the acoustic test cavity at approximately a center of the acoustic test cavity.

3. The apparatus of claim 1, wherein the at least two sound sources and the at least two device sockets are located approximately equidistantly from the reference microphone.

4. The apparatus of claim 1, wherein the at least two device sockets are positioned around the acoustic test cavity approximately symmetrically with respect to the reference microphone.

5. The apparatus of claim 1, wherein the acoustic test cavity comprises a circular shape, and wherein the acoustic test cavity comprises an opening for the reference microphone at a center of the circular shape.

6. The apparatus of claim 5, wherein the acoustic test cavity comprises at least two source openings configured to couple to the at least two sound sources, and wherein the at least two source openings are positioned at approximately a same distance from the center of the circular shape and at approximately opposite sides from each other across the center of the circular shape.

7. The apparatus of claim 1, wherein the acoustic test cavity comprises a plurality of secondary shapes coupled to a center opening, wherein the center opening is configured to couple to the reference microphone, and wherein the plurality of secondary shapes is configured to couple to at least one of the at least two sound sources and the at least two device sockets.

8. The apparatus of claim 7, wherein the plurality of secondary shapes is configured to symmetrically couple the at least two sound sources to the acoustic test cavity.

9. The apparatus of claim 7, wherein the plurality of secondary shapes comprises petals.

10. The apparatus of claim 9, wherein the plurality of secondary shapes comprises curved petals, wherein the at least two sound sources and the at least two device sockets are coupled to one of the curved petals such that there is no direct acoustic path from one of the at least two sound sources and the at least two device sockets to another of the at least two sound sources and the at least two device sockets.

11. The apparatus of claim 9, wherein the plurality of secondary shapes comprises at least six petals, and wherein each of the at least six petals are coupled to one of at least four device sockets and at least two sound sources.

12. The apparatus of claim 1, wherein the at least two device sockets are configured to receive microelectromechanical systems (MEMS) microphone devices.

13. The apparatus of claim 12, wherein the at least two device sockets are configured to provide electrical coupling to the MEMS microphone devices.

14. A method of testing electroacoustic devices, comprising:
    activating two or more sound sources coupled to an acoustic test cavity to generate a sound field within the acoustic test cavity, wherein the acoustic test cavity comprises a platform sealed against a printed circuit board (PCB) to form the acoustic test cavity;
    measuring a reference output from a single reference microphone acoustically coupled to the acoustic test cavity in response to the sound field;
    simultaneously measuring outputs from two or more miniature electroacoustic devices acoustically coupled to the acoustic test cavity in response to the sound field; and
    comparing the reference output with each of the outputs from the two or more miniature electroacoustic devices.

15. The method of claim 14, further comprising inserting two or more microelectromechanical systems (MEMS) microphone devices into two or more test sockets of a testing apparatus, wherein the two or more test sockets are coupled to an acoustic test cavity comprising an enclosed air volume, and wherein the acoustic test cavity is coupled to the single reference microphone for simultaneously testing the two or more microelectromechanical systems (MEMS) microphone devices.

16. The method of claim 14, wherein the step of inserting two or more miniature electroacoustic devices comprises inserting two or more miniature microphone devices approximately equidistantly from the single reference microphone.

* * * * *

UNITED STATES PATENT AND TRADEMARK OFFICE
CERTIFICATE OF CORRECTION

| | |
|---|---|
| PATENT NO. | : 11,190,890 B2 |
| APPLICATION NO. | : 16/500157 |
| DATED | : November 30, 2021 |
| INVENTOR(S) | : Khenkin et al. |

It is certified that error appears in the above-identified patent and that said Letters Patent is hereby corrected as shown below:

On the Title Page

In Item (72), under "Inventors", in Column 1, Line 4, delete "Keith Getz," and insert -- Keith Getz, Deceased, --, therefor.

Signed and Sealed this
Seventeenth Day of January, 2023

Katherine Kelly Vidal
*Director of the United States Patent and Trademark Office*